United States Patent [19]
Heximer et al.

[11] Patent Number: 6,113,139
[45] Date of Patent: Sep. 5, 2000

[54] APPARATUS FOR SENSING A FORWARD POSITION OF A VEHICLE SEAT

[75] Inventors: Lawrence G. Heximer, Howell; Rodney A. Dale, Westland, both of Mich.

[73] Assignee: TRW Inc., Lyndhurst, Ohio

[21] Appl. No.: 09/131,490

[22] Filed: Aug. 10, 1998

[51] Int. Cl.[7] .............................. B60R 21/32; B60N 2/42
[52] U.S. Cl. ...................................... 280/735; 297/216.18
[58] Field of Search ...................... 280/735; 297/216.18, 297/344.1

[56] References Cited

U.S. PATENT DOCUMENTS

| | | |
|---|---|---|
| 5,624,132 | 4/1997 | Blackburn et al. . |
| 5,653,462 | 8/1997 | Breed et al. . |
| 5,803,491 | 9/1998 | Barnes et al. ........................... 280/735 |
| 5,967,549 | 10/1999 | Allen et al. ............................. 280/735 |

*Primary Examiner*—Paul N. Dickson
*Assistant Examiner*—Faye M. Fleming
*Attorney, Agent, or Firm*—Tarolli, Sundheim, Covell, Tummino & Szabo L.L.P.

[57] ABSTRACT

An apparatus (10) includes a seat bracket (24) mountable to a lower body portion (18) of a vehicle. The seat bracket (24) has first and second spaced apart end portions (26, 28) and a longitudinal axis (30) extending through the end portions (26, 28). An elongated seat rail member (48) has first and second end portions (52, 54) and is mountable to the vehicle seat (12). The seat rail member (48) moves longitudinally relative the seat rail member (48) substantially parallel to the seat bracket axis (30). A switch (70) is responsive to the seat rail member (48) being located within a predetermined forward position relative to the seat bracket (24). The switch (70) provides a signal indicating that the seat rail member (48) is at the predetermined forward position and forward of the predetermined forward position.

4 Claims, 3 Drawing Sheets

APPARATUS FOR SENSING A FORWARD POSITION OF A VEHICLE SEAT

TECHNICAL FIELD

The present invention relates to an apparatus for sensing a position of a seat in a vehicle.

BACKGROUND OF THE INVENTION

It is often undesirable to actuate an occupant protection device, such as an air bag, when the vehicle occupant is positioned close to the protection device. In order to remedy this problem, numerous complex systems have been developed to detect the position of the vehicle occupant relative to the protection device. Some systems utilize an array of ultrasonic sensors to detect the occupant position. Other systems utilize infrared sensors, microwave sensors or a combination of various sensing devices to detect the position of the vehicle occupant. Such position sensing equipment usually is expensive and requires complicated electronics.

SUMMARY OF THE INVENTION

An apparatus is provided for sensing a forward position of a vehicle seat which is movable forwardly and rearwardly in a vehicle. The apparatus includes a seat bracket mountable to a lower body portion of a vehicle. The seat bracket has first and second spaced apart end portions and a longitudinal axis extending through the first and second end portions. An elongated seat rail member is mountable to the vehicle seat and has first and second ends. The seat rail member is supported by and movable relative to the seat bracket substantially parallel to the seat bracket axis upon movement of the seat in the vehicle. A switch is actuated in response to the seat rail member being located at a predetermined forward position relative to the seat bracket. The switch remains actuated as the seat rail member is positioned from the predetermined forward position to a full forward position. The switch, when actuated, provides a signal indicating whether the seat rail member is at or forward of the predetermined forward position.

BRIEF DESCRIPTION OF THE DRAWINGS

The foregoing and other features of the invention will become more apparent to one skilled in the art upon consideration of the following description of the invention and the accompanying drawings in which.

DESCRIPTION OF A PREFERRED EMBODIMENT

Figure 1:
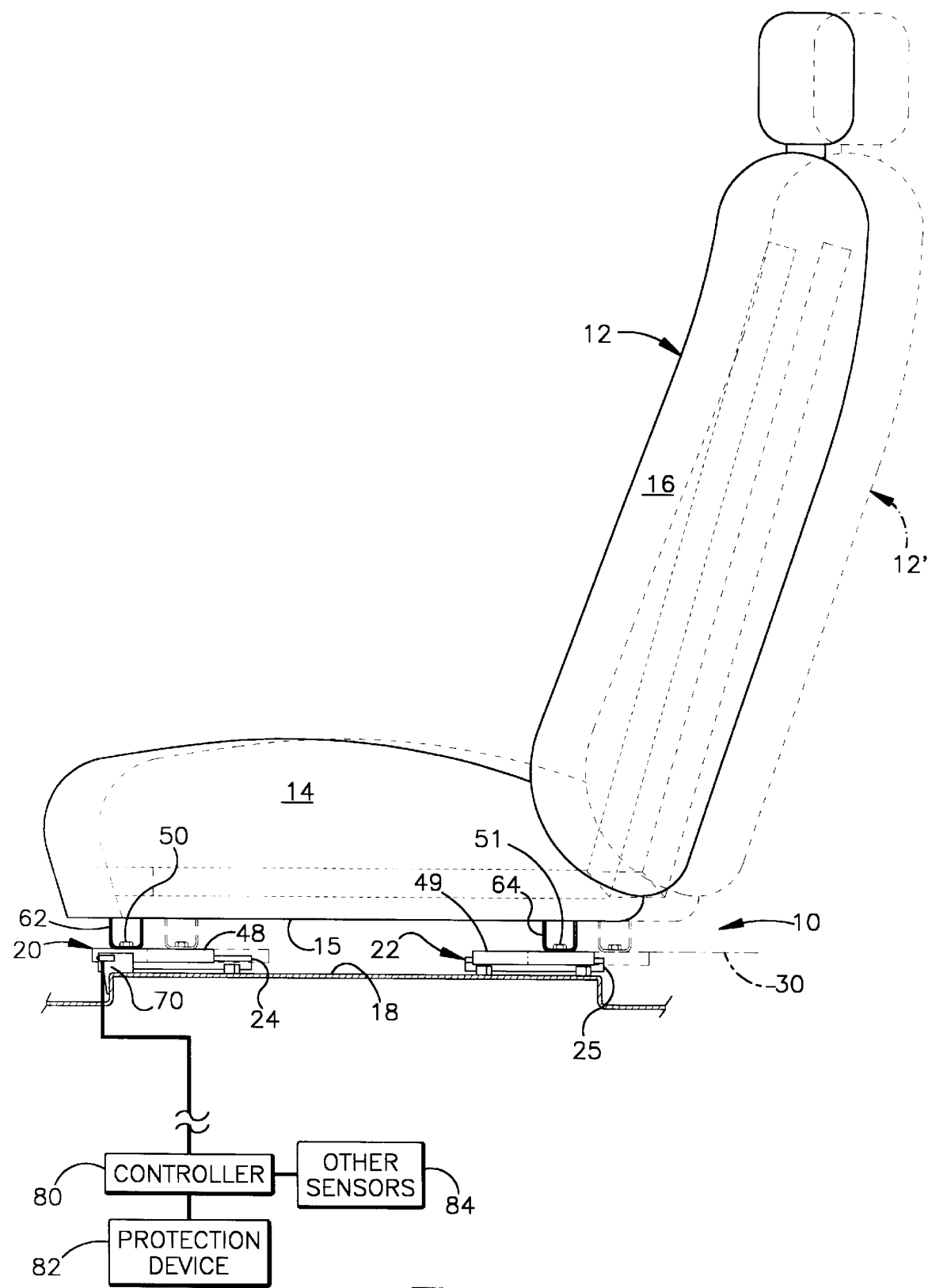
FIG. 1 is a schematic representation of a side elevation of an apparatus in accordance with a preferred embodiment of the present invention.

FIG. 1 illustrates a seat position sensing apparatus 10. The apparatus 10 is associated with a vehicle seat 12. The seat 12 includes a seat cushion portion 14 and a seat back portion 16 extending upwardly from the seat cushion portion 14. The seat 12 is located within a vehicle occupant compartment and is adjustably (movably) mounted to a lower body portion 18 of a vehicle. The seat 12 is illustrated in solid lines in a first forward position, and in dotted lines in a more rearward position designated at 12'.

The particular manner in which the seat 12 is moved forward and rearward is not critical to the present invention. The seat may be moved forwardly and rearwardly, for example, by actuating an appropriate electric motor (not shown) operatively coupled to the seat 12 or by manual adjustment after releasing a seat latch by movement of a known mechanical release lever (not shown).

In general, forward and rearward movement of the vehicle seat 12 is guided by guide tracks, indicated at 20 and 22. While FIG. 1 illustrates a pair of such guide tracks 20 and 22, it will be appreciated that typically there are four such guide tracks near the corner portions of a lower surface 15 of the seat cushion portion 14.

Each guide track 20 and 22 includes a seat bracket, indicated at 24 and 25, respectively, mounted to the lower body portion 18 of the vehicle. The brackets 24 and 25 are formed of a suitable rigid material, such as, for example, steel.

Figure 2:
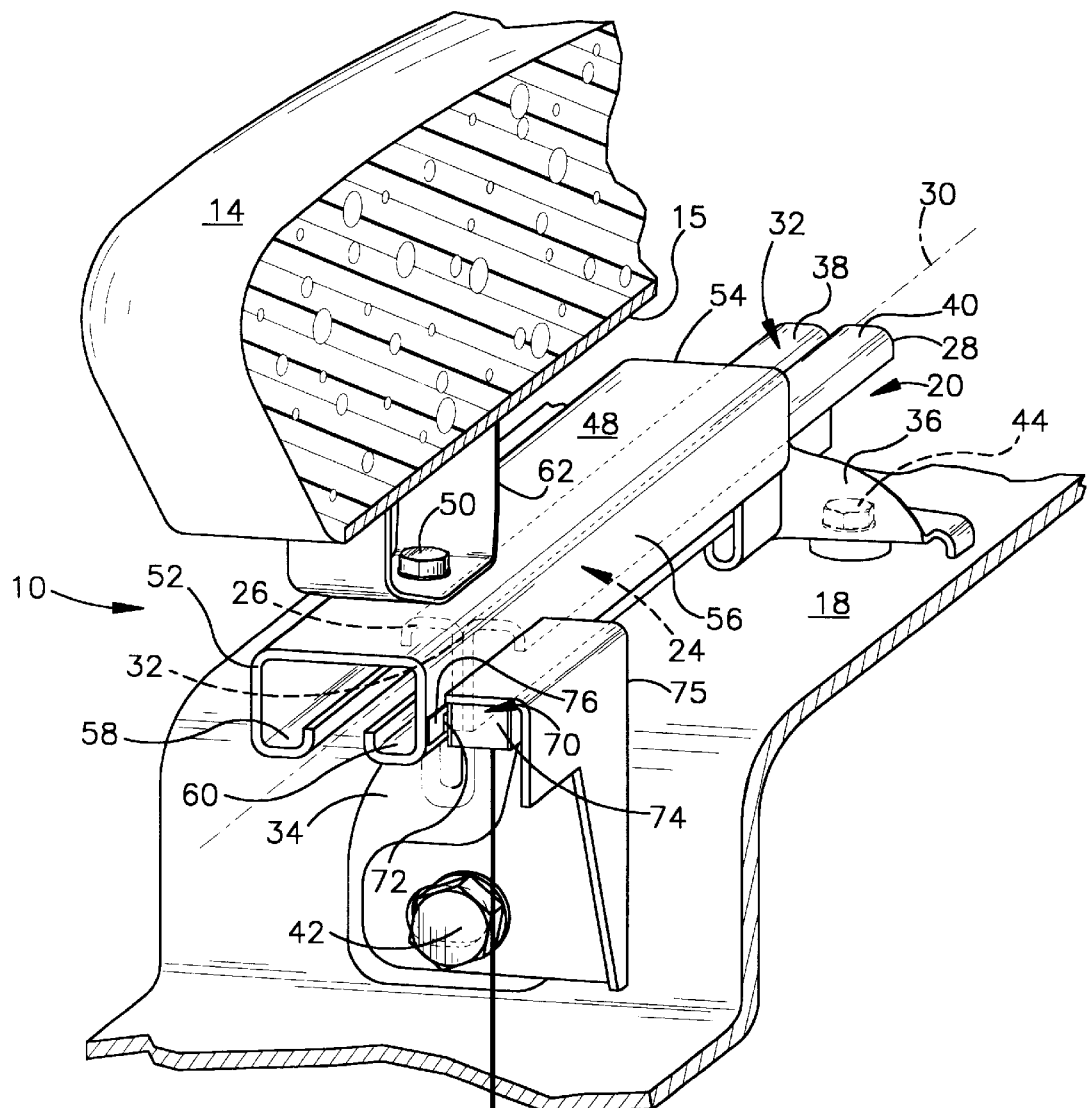
FIG. 2 is an enlarged perspective view of a portion of the apparatus of FIG. 1, illustrating a first condition of the apparatus.
Figure 3:
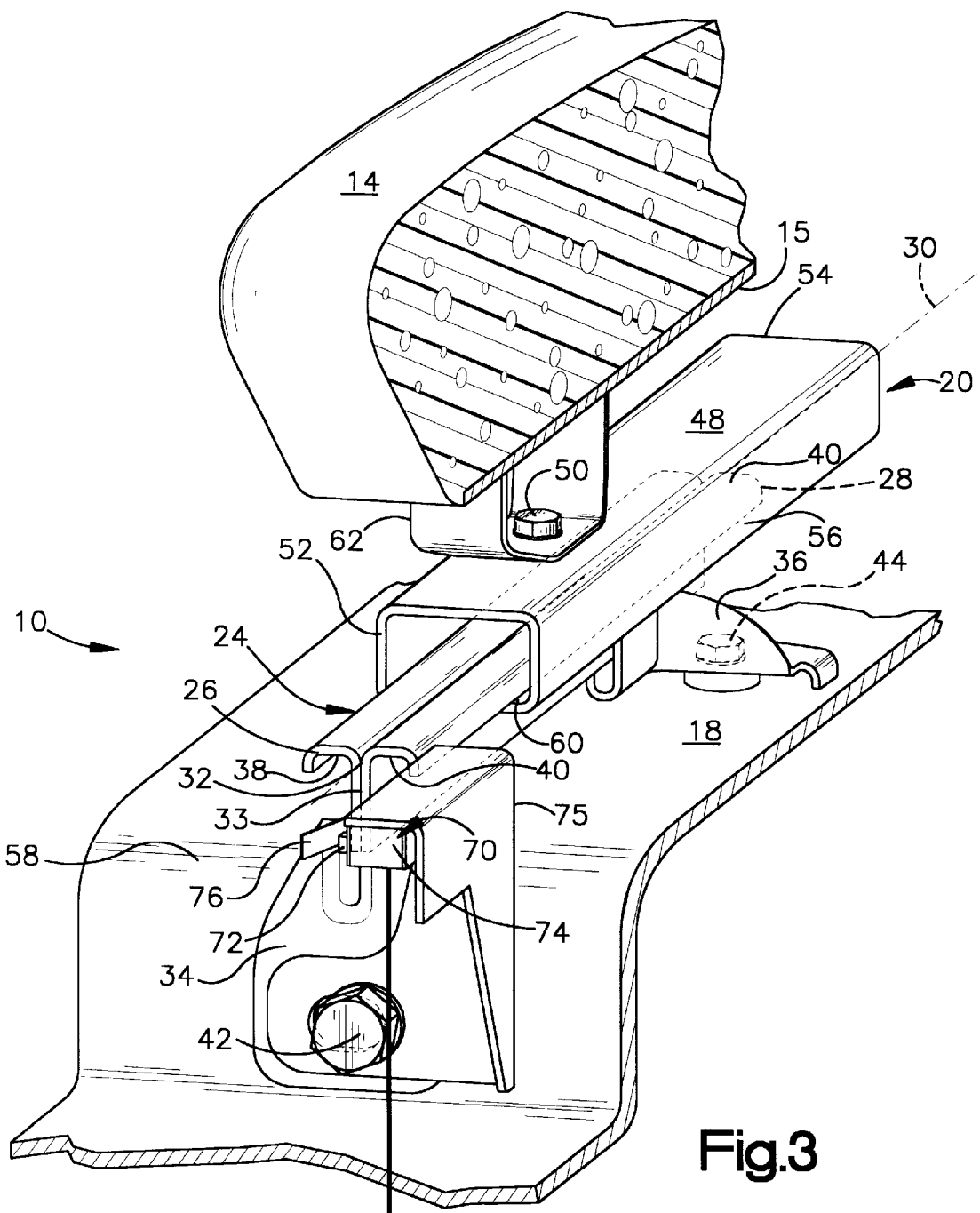
FIG. 3 is a perspective view of the apparatus of FIG. 2, illustrating a second condition of the apparatus.

In the preferred embodiment illustrated in FIGS. 2 and 3, the bracket 24 of guide track 20 is an elongated T-shaped guide member 32 connected to the lower body portion 18. The guide member 32 includes first and second spaced apart end portions 26 and 28. A longitudinal axis 30 of the guide member 32 extends through the end portions 26 and 28. A vertical base portion 33 of the T-shaped guide member 32 is supported by a pair of spaced apart bracket members 34 and 36. The bracket members 34 and 36 are secured to the lower vehicle body portion 18 by appropriate fasteners, illustrated at 42 and 44. Other types of fastening means also may be used, which, for example, may include rivets, screws or welding the bracket members 34 and 36 to the vehicle body portion 18. The T-shaped member 32 includes laterally extending opposed flanged portions 38 and 40. Preferably, the flanged portions 38 and 40 extend outwardly transverse to the vertical base portion 33 and curve downwardly towards the lower body portion 18. The flanged portions 38 and 40 form a pair of adjacent, longitudinal channels which extend parallel to the bracket axis 30.

The seat bracket 25 preferably is substantially identical to the bracket 24 just described. Alternatively, a single elongated seat bracket (not shown) could be used instead of the pair of the coaxial seat brackets 24 and 25 shown in FIG. 1.

Referring to FIG. 1, elongated seat rail members 48 and 49 are mounted to the lower surface 15 of the seat cushion portion 14 by appropriate fasteners 50 and 51, respectively. Each seat rail member 48 and 49 is supported by a respective seat bracket 24 and 25. Each rail member 48 and 49 also is supported by and movable relative to a respective one of the seat brackets 24 and 25 in a direction substantially parallel to the seat bracket axis 30. This supports the seat 12 for forward and rearward movement in the vehicle.

As shown in FIGS. 2 and 3, the seat rail member 48 has first and second spaced apart end portions 52 and 54, with an elongated body portion 56 extending between the end portions 52 and 54. Preferably, the body portion 56 is a generally rectangular cylinder having elongated sidewall portions. A pair of opposed upturned flange portions extend longitudinally along a lower sidewall portion of the body portion 56 to define substantially parallel elongated channel portions 58 and 60. The elongated channel portions 58 and 60 matingly receive and slidably engage the respective flanged portions 38 and 40 of the T-shaped member 32, which supports the seat 12 for longitudinal movement substantially parallel to the axis 30. Appropriate bearings (not shown) also may be used to support the seat and facilitate the longitudinal movement of the seat rail member 48 relative to the bracket 24.

The seat rail member 49 preferably is substantially identical to the rail member 48 just described. Alternatively, a single elongated rail member (not shown) could be used instead of the two spaced apart rail members 48 and 49 shown in FIG. 1.

The seat cushion portion 14 preferably is mounted to and spaced apart from the seat rail member 48 and 49 by respective frame members 62 and 64. The frame members 62 and 64 extend downwardly from the lower surface 15 of the seat cushion portion 14. The frame members 62 and 64 are secured to the upper surface of the rail members 48 and 49 by the fasteners 50 and 51, respectively.

While a preferred embodiment of the seat track 20 has been described, it will be understood and appreciated by those skilled in the art that the apparatus of the present invention may be used with any known type of seat track.

A switch, indicated at 70, is mounted adjacent the first end portion 26 of the seat bracket 24. The switch 70 has at least two states. The switch 70 is actuated from one state to another in response to the presence or absence of the seat rail member 48 being located at a predetermined forward position relative to the seat bracket 24. The switch 70 remains actuated as the seat rail member 48 is moved forward of the predetermined position through a range of movement from the predetermined position to a full-forward position. The switch 70, when actuated, provides a signal indicating whether the first end portion 52 of the seat rail member 48 is located at or forward of the predetermined forward position.

It is desirable to position the switch 70, such that the switch is actuated (changes states) when the seat cushion portion 14 moves forwardly to a position located, for example, at about 50 to about 100 millimeters from a full-forward position. Preferably, the switch 70 is actuated when the seat cushion 14 is moved forwardly to a position located at about 75 millimeters from its full-forward position. The switch 70 remains actuated while the seat cushion portion 14 is located forward of its position of 75 millimeters from its full-forward position. The switch 70 is deactuated when the seat cushion portion 14 is positioned rearwardly beyond about 75 millimeters from its full-forward position. The signal of switch 70, thus, provides an indication of whether the seat 12 is within some predetermined distance of its full-forward position.

The preferred embodiment of the switch 70 is a solid state mechanical switch. The switch 70 includes a compressible plunger member 72 movable relative to a base portion 74 between first and second positions corresponding to the states of the switch 70. The base portion 74 of the switch 70 is fixed relative to the bracket 24 by a switch supporting structure 75. The switch 70 also includes an elongated moveable arm 76 hingedly connected to the base portion 74, with a distal portion engaging the plunger member 72. When the elongated arm 76 engages a side portion of the seat rail member 48, the arm 76 compresses the plunger member 72, as is shown in FIG. 2. Compressing the plunger member 72 causes the switch 70 to be actuated (change states), such as, for example, to its first state. Conversely, as the seat rail member 48 is moved away from the front end portion 26 of the bracket 24, such as is shown in FIG. 3, the arm 76 does not engage the rail member 48. The compressible plunger member 72 moves outwardly biasing the arm 76 away from the base portion 74. The switch 70, thus is deactuated and changes from its first state to its second state.

Other types of switches also may be used. For example, the switch 70 could be an infrared switch, a magnetic switch, a sealed mechanical wiper switch etc.

The signal from switch 70 is directed to a controller 80. Preferably, the controller 80 is a microcomputer. The controller 80 also may comprise an integrated circuit, a plurality of discrete components or a combination of integrated circuits and discrete components configured to provide desired functions.

The controller 80 is electrically coupled to an actuatable protection device 82 for, when actuated, helping to protect a vehicle occupant in a crash event. The protection device 82 suitably is an air bag, such as for a driver or front passenger of the vehicle. Other actuatable vehicle occupant protection devices that can be used in accordance with the present invention include, for example, inflatable knee bolsters, and knee bolsters operated by inflatable air bags. The controller 80 also is coupled to other sensors, schematically indicated at 84. The other sensors 84 may include, for example, a crash sensor, a seat belt buckle switch sensor, a vehicle speed sensor, an occupant weight sensor or any other sensing device or combination of devices which provide useful information concerning actuation of the protection device 82. The other sensors 84 provide signals to the controller 80 indicative of one or more vehicle and occupant conditions.

The controller 80 utilizes the signal from switch 70 to control the actuation of the protection device 82. For example, where the switch signal indicates that the seat cushion portion 14 is within the predetermined forward range of positions relative to the bracket 24, the controller 80 may control actuation of the occupant protection device 82 so that its inflation is somewhat delayed. Under appropriate circumstances, the switch signal also might be used by the controller 80, in combination with the signals from the other sensors 84, to delay or even prevent actuation of the protection device 82.

Accordingly, the present invention provides a simple yet reliable seat position sensing apparatus, which is readily adaptable to various seat track designs. The apparatus of the present invention further provides reliable seat position information with readily available and relatively low cost electronics.

From the above description of the invention, those skilled in the art will perceive improvements, changes and modifications. Such improvements, changes and modifications within the skill of the art are intended to be covered by the appended claims.

What is claimed is:

1. An apparatus for sensing a forward position of a seat in a vehicle, said apparatus comprising:

a seat bracket mountable to a lower portion of a vehicle, said seat bracket having first and second spaced apart end portions and a longitudinal axis extending through said first and second end portions;

an elongated seat rail member mountable to a vehicle seat, said rail member having first and second ends, said seat rail member being movable relative said seat bracket substantially parallel to said seat bracket axis; and a switch being actuated in response to said seat rail member being located at a predetermined forward position relative to said seat bracket, said switch remaining actuated upon positioning said seat rail member at a location from said predetermined forward position to a full-forward position, said switch, when actuated, providing a signal indicating whether said seat rail member is at or forward of said predetermined forward position, wherein said switch is mounted adjacent said first end portion of said seat bracket, wherein said switch further comprises a compressible plunger which compresses upon engaging said seat rail member, thereby indicating the presence of said seat rail member at or forward of said predetermined forward position, said plunger remaining compressed upon positioning said seat rail member forward of said predetermined forward position.

2. An apparatus for sensing a forward position of a seat in a vehicle, said apparatus comprising:

a seat bracket mountable to a lower portion of a vehicle, said seat bracket having first and second spaced apart end portions and a longitudinal axis extending through said first and second end portions;

an elongated seat rail member mountable to a vehicle seat, said rail member having first and second ends, said seat rail member being movable relative said seat bracket substantially parallel to said seat bracket axis; and a switch being actuated in response to said seat rail member being located at a predetermined forward position relative to said seat bracket, said switch remaining actuated upon positioning said seat rail member at a location from said predetermined forward position to a full-forward position, said switch, when actuated, providing a signal indicating whether said seat rail member is at or forward of said predetermined forward position, wherein said seat rail member slidably engages said seat bracket for longitudinal movement substantially parallel to said bracket axis, wherein said seat rail member further comprises a longitudinal channel formed in said seat rail member and extending between said first and second ends of said seat rail member, and said seat bracket further comprises an elongated upper portion slidably received within said longitudinal channel of said seat rail member, wherein said switch further comprises a compressible plunger positioned adjacent said first end of said seat bracket, said plunger compressing upon engaging said seat rail member, thereby indicating the presence of said seat rail member at or forward of said predetermined forward position, said plunger remaining compressed upon positioning said seat rail member forward of said predetermined forward position.

3. An apparatus for sensing a forward position of a seat in a vehicle, said apparatus comprising:

a seat bracket mountable to a lower portion of a vehicle, said seat bracket having first and second spaced apart end portions and a longitudinal axis extending through said first and second end portions;

an elongated seat rail member mountable to a vehicle seat, said rail member having first and second ends, said seat rail member being movable relative said seat bracket substantially parallel to said seat bracket axis; and a switch being actuated in response to said seat rail member being located at a predetermined forward position relative to said seat bracket, said switch remaining actuated upon positioning said seat rail member at a location from said predetermined forward position to a full-forward position, said switch, when actuated, providing a signal indicating whether said seat rail member is at or forward of said predetermined forward position; and an actuatable occupant protection device for, when actuated, helping to protect a vehicle occupant, and a controller for controlling actuation of said occupant protection device in response to said switch signal, wherein said controller delays actuation of said occupant protection device in response to said switch signal indicating said seat rail is at or forward of said predetermined position.

4. The apparatus of claim 3 further comprising:

a vehicle seat having a cushion portion, said seat rail member being mounted to said cushion portion of said vehicle seat.

* * * * *